Feb. 19, 1952 W. G. PFANN 2,586,080

SEMICONDUCTIVE SIGNAL TRANSLATING DEVICE

Filed Oct. 11, 1949 2 SHEETS—SHEET 1

INVENTOR
W. G. PFANN
BY
J. Guenther
ATTORNEY

LEGEND – FIGS. 4, 5, & 7-13
N TYPE
P TYPE

INVENTOR
W. G. PFANN
BY [signature]
ATTORNEY

Patented Feb. 19, 1952 2,586,080

UNITED STATES PATENT OFFICE 2,586,080

SEMICONDUCTIVE SIGNAL TRANSLATING DEVICE

William G. Pfann, Chatham, N. J., assignor to Bell Telephone Laboratories, Incorporated, New York, N. Y., a corporation of New York Application October 11, 1949, Serial No. 120,662

14 Claims. (Cl. 179—171)

This invention relates to semiconductive signal translating devices and more particularly to such devices of the type disclosed in the application Serial No. 120,661, filed October 11, 1949, of W. G. Pfann, now Patent No. 2,570,978, issued October 9, 1951.

Devices of the type disclosed in the application above identified comprise, generally, a semiconductive body, for example of germanium, having two contiguous zones of opposite conductivity type, i. e. N and P types, and a pair of rectifying connections, one to each zone of the body. Each of the rectifying connections is biased in the reverse or high impedance direction relative to the respective zone so that the electrical carriers, holes or electrons, introduced at each connection flow across the barrier or junction between the two zones and to the opposite connection with consequent current multiplication at one or both of the connections. Thus, large current gains may be realized.

One general object of this invention is to improve, and to increase the field of utility of, such semiconductor translating devices. More specifically, objects of this invention are to increase the current gain of semiconductor signal translating devices, to improve the stability of such devices, to enable the association, by way of a single semiconductor translating device, of any one of a number of output circuits individually with a common input circuit, and to achieve gain in each of such output circuits whereby switching and amplification may be realized concomitantly.

In one illustrative embodiment of the invention, a translating device comprises a body of semiconductive material, such as germanium, having therein an array of zones of opposite conductivity type, the two types of zones being in alternate relation and the zones being contiguous to provide PN barriers or junctions between each two adjacent zones. Individual rectifying collector connections are provided to the zones, and an input emitter connection is made to one of the zones. A third substantially ohmic connection, designated the base, to the semiconductive body also is provided.

In accordance with one feature of this invention, the several collectors are biased each in the reverse or high impedance direction relative to the respective zone and such that each collector functions as an emitter with respect to the next succeeding one viewed with respect to the input emitter. Each pair of successive collectors in cooperation effects a multiplication of the current to the first collector of the pair. Thus, a signal impressed between the input emitter and the base is amplified successively at each collector whereby a large over-all gain for the device is realized. The gain at each stage, i. e. between each pair of collectors, may be made such that possibilities of instability are minimized.

In accordance with another feature of this invention, in association with a device of the construction above described means are provided for selectively biasing one or more of the collectors to cooperatively associate any one of a number of the collectors with the input emitter, thereby, in effect, to selectively switch the input circuit to any one of output circuits individual to the collectors.

The invention and the above-noted and other features thereof will be understood more clearly and fully from the following detailed description with reference to the accompanying drawing in which.

Figure 9:
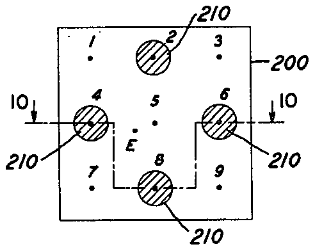
Figure 11:
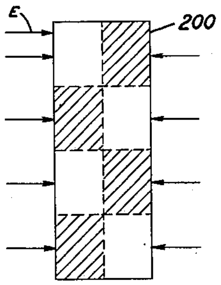
Figure 10:
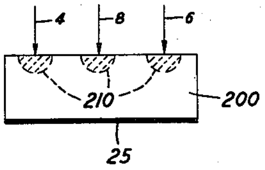
Figure 12:
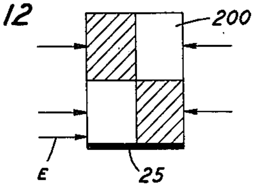

Figs. 9 and 10 are plan and sectional views respectively of another illustrative embodiment of this invention wherein the P zones are in the form of islands in an N-type semiconductive body; and Figs. 11 and 12 are elevational and plan views respectively of another embodiment of this invention wherein contiguous zones of opposite conductivity type are provided in opposite faces of the semiconductive body.

In the drawing, in the interest of clarity, dimensions have been greatly exaggerated. The nature of the exaggeration will be appreciated from typical dimensions in a device of the construction illustrated in Fig. 1 wherein the semiconductive body may be of the order of .020 inch thick, .12 inch long, and .050 inch wide, and adjacent contacts may be spaced of the order of 4 mils.

Figure 1:
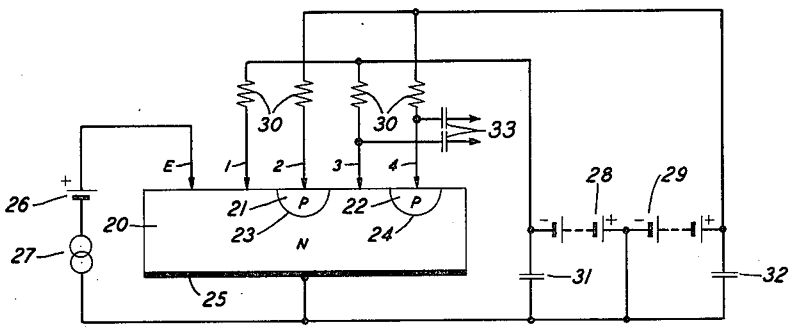
Fig. 1 is a diagram showing the principal elements and the association thereof in a multistage amplifier illustrative of one embodiment of the invention.

Referring now to the drawing, the translating device illustrated in Fig. 1 comprises a semiconductive body or wafer 20 of N conductivity type material having therein two zones or islands 21 and 22 of P conductivity type material, each zone forming a PN function or barrier 23 or 24 with the body 20.

Bearing against one face of the body are a plurality of point contacts, for example of Phosphor bronze, E and 1 to 4, inclusive, the contacts 2 and 4 bearing against the P-type zones 21 and 22, respectively, and the contacts E, 1 and 3 bearing against the N body 20.

The body 20 may be of high back voltage N-type germanium produced, for example, in the manner disclosed in the application Serial No. 638,351, filed December 29, 1945, of J. H. Scaff and H. C. Theuerer and the surface thereof against which the point contacts bear may be treated in the manner disclosed in the application Serial No. 67,797, filed December 29, 1948, of W. G. Pfann, now Patent No. 2,577,803, issued December 11, 1951. The P-type zones may be formed in the body 20 in several ways, for example by nuclear bombardment of restricted areas of the surface of the body 20 against which the point contacts bear as disclosed in the application Serial No. 89,369, filed April 27, 1949, of W. Shockley.

The body 20 has on the face thereof opposite that against which the point contacts bear a large area or ohmic connection 25 termed the base, which may be, for example, a plated coating of rhodium on the body. The point contact E functions as an emitter and is biased in the forward direction by a direct-current source 26, the bias being for example of the order of 1 or a fraction of 1 volt. In series with the source 26 is the input signal source 27. Each of the point contacts 1 to 4, inclusive, is biased in the reverse direction with respect to the zone against which it bears by a direct-current source 28 or 29 to which it is connected by an appropriate resistor 30, by-pass condensers 31 and 32 being provided as shown. Specifically, it will be noted that the contacts 1 and 3, which bear against the N-type body, are biased negatively with respect to the base 25, whereas the contacts 2 and 4, which bear against the P-type zones 21 and 22, respectively, are biased positively with respect to the base 25. The biases upon the point contacts 1 to 4 may be of the order of 10 to 100 volts and the contacts 2, 3 and 4 are biased so that the contact 3 is more negative with respect to the contact 2 than is the contact 1, and the contact 4 is more positive with respect to the contact 3 than is the contact 2. An output circuit may be connected to the contacts 3 and 4 by way of blocking condensers 33.

In the operation of the device, a signal is impressed between the emitter E and the base 25 by the source 27 and as described in detail in Patent No. 2,524,035, granted October 3, 1950, to J. Bardeen and W. H. Brattain, holes are injected into the body 20 in the vicinity of the emitter E. These holes are attracted to the contact 1 and effect an increase in the current flowing through this contact whereby a current multiplication or gain is realized. As described in the application Serial No. 120,661, of W. G. Pfann hereinabove referred to, electrons from the vicinity of the point contact 1 cross the barrier 23 into the P zone 21 and flow to the contact 2. These electrons modulate the field in the zone 21 in the vicinity of the contact 2, whereby a further current multiplication or gain is realized. Similarly, the flow of carriers from the zone 21 across the barrier 23 to the vicinity of the contact 3 and from the vicinity of the contact 3 across the barrier 24 to the P zone 22 results in a current gain or multiplication at the point contacts 3 and 4. In effect, the input signal is transmitted in succession from the emitter E to the point contact 1 and then to the succeeding contacts 2, 3 and 4. As was pointed out in the application of W. G. Pfann heretofore identified, because of the mutual interaction between the point contacts 3 and 4, an additional current multiplication of gain is realized. By proper correlation of the parameters involved, equal amplified currents may be produced in the contacts 3 and 4, which currents are 180 degrees out of phase. These currents may be utilized via the output circuit to produce push-pull amplification.

The current multiplication obtained at any two successive point contacts A and B may be expressed by a factor $\alpha$, which is defined as $$\alpha_{AB}=\left(\frac{\delta I_A}{\delta I_B}\right)_{E_A=\text{constant}}$$

and $$\alpha_{BA}=\left(\frac{\delta I_B}{\delta I_A}\right)_{E_B=\text{constant}}$$

where the I's are the currents flowing through the respective contacts and the E's are the potentials of the contacts. It is not necessarily true that $\alpha_{AB}=\alpha_{BA}$. The value of $\alpha$ for any contact may be controlled by forming treatment of the contact. For example, when the collector contact *c* to a body of N-type germanium is formed, as in the manner disclosed in the application Serial No. 67,797 referred to hereinabove, $\alpha_{ce}$, *e* designating the emitter, may be greater than unity whereas $\alpha_{ec}$, may be substantially zero.

The magnitudes of the over-all current gain obtainable with a device of the construction illustrated in Fig. 1 will be appreciated from the following example for the case wherein the resistors 30 are zero. If $$\alpha_{E1}=\alpha_{12}=\alpha_{23}=0$$

$$\alpha_{1E}=\alpha_{21}=\alpha_{32}=2$$

$$\alpha_{34}=0.9 \text{ and } \alpha_{43}=1$$

the over-all multiplication factor $$\alpha_{4E}=\frac{\alpha_{1E}\alpha_{21}\alpha_{32}\alpha_{43}}{1-\alpha_{34}\alpha_{43}}=80$$

When the resistors 30 are positive, the over-all amplification factor $\alpha_{4E}$ will be somewhat smaller than 80.

It will be apreciated, therefore, that in a device, such as illustrated in Fig. 1, very large current gains can be realized and further, that inasmuch as the gain per stage may be controlled, very large over-all gain without danger of instability of operation may be achieved.

The junctions or barriers 23 and 24 between P zones and the N-type body are photosensitive. Thus, the signal current may be modulated by projecting a modulated light beam or beams against the surface of the body 20 against which the contacts bear at the region or regions where the barriers meet this surface.

Figure 2:
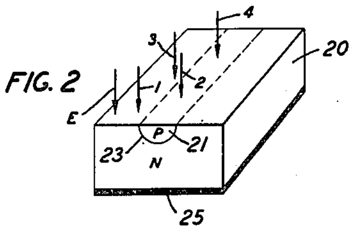
Figs. 2 and 3 are perspective views showing two forms of semiconductive body and associated point contacts which may be utilized in the device illustrated in Fig. 1.

The semiconductive body in the device of Fig. 1 may be of any one of different forms. For example, in one form illustrated in Fig. 2, the P zone 21 extends across the N-type body 20 and the emitter and point contacts 1 and 3 bear against the N body to the side of the barrier or junction 23 opposite that against which the point contacts 2 and 4 bear. All the point contacts may be spaced of the order of 2 mils from the barrier.

Figure 3:
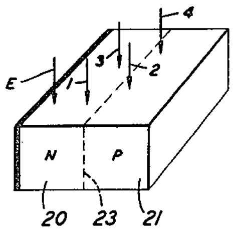

In another form illustrated in Fig. 3, the base connection 25 is applied to one side face of the body and the barrier 23 extends completely through the body dividing it into N and P zones 20 and 21, respectively. The emitter E and point contacts 1 and 3 are arranged on one side of the barrier 23 and the point contacts 2 and 4 bear against the P-type zone 21 on the opposite side of this barrier or junction. The contact to barrier spacing may be as in the device illustrated in Fig. 2.

As has been described hereinabove, in a device of the construction illustrated in Fig. 1, the signal impressed upon the emitter E is in effect passed in succession along the point contacts 1 to 4, inclusive. Inherently the signal may be transmitted or passed from one of the point contacts to a succeeding one bearing against the zone of opposite conductivity to that of the zone against which the first contact bears, but the signal cannot be passed from one contact to a succeeding one bearing against a zone of the same conductivity type as that against which the first bears. Thus, the last of the contacts to which a signal may be transmitted or passed may be determined by control of the biases upon the contacts. Specifically, for example, if in the device illustrated in Fig. 1 the bias on contact 3 is removed, a signal introduced at the emitter E will not pass beyond the point contact 2. This feature may be utilized to effect multiplex switching.

Figure 4:
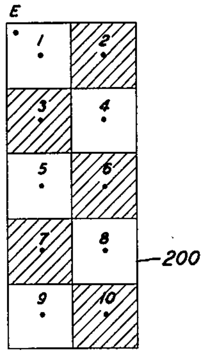
Figs. 4 and 5 are plan and elevational views respectively of a translating device illustrative of another embodiment of this invention and particularly suitable for use as a multiplex switch.
Figure 5:
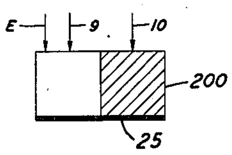

One form of device suitable for use as a multiplex switch is illustrated in Figs. 4 and 5. It comprises two rows of P and N zones in the semiconductive body, the zones in each row being of opposite conductivity type and adjacent zones in the two rows also being of opposite conductivity type as will be clear from the legend with reference to these and other figures. The emitter E bears against one of the end zones in one of the rows, specifically the upper left-hand zone in Fig. 4 and individual point contacts 1 to 10, inclusive, are provided to the zones, the point contacts being indicated by dots in Fig. 4.

Figure 6:
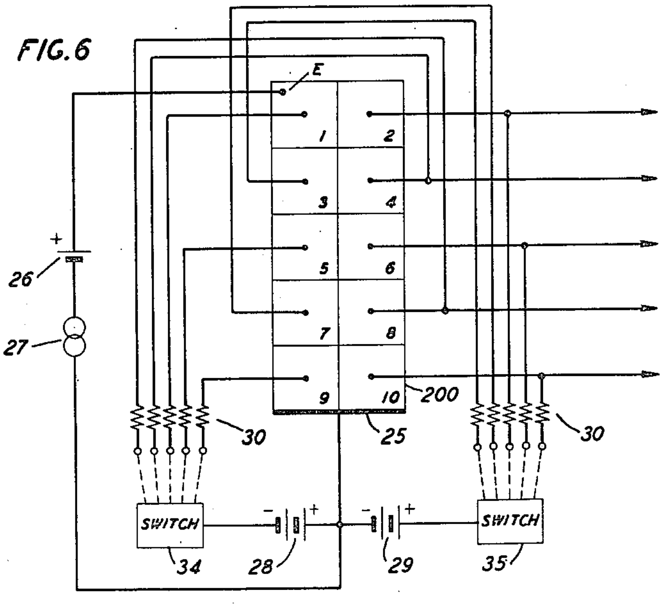
Fig. 6 is a diagram illustrating one manner in which the device of Fig. 1 may be operated.

One manner in which the device illustrated in Figs. 4 and 5 may be operated is shown in Fig. 6. The input signal is impressed between the emitter E and the base 25, the emitter being biased in the forward direction by source 26. Each of the contacts 1 to 10, inclusive, is adapted to be connected through a suitable resistor 30 and by way of a switch 34 or 35 to the biasing source 28 or 29, which will bias it in the reverse direction relative to the zone on which it bears. Appropriate output circuits are connected to the zones against which the even-numbered point contacts bear.

It will be evident that any one of the output circuits may be cooperatively associated with the emitter by appropriately biasing certain of the point contacts to establish a chain of adjacent PN zones over which the signal may be transmited from the emitter. For example, if only the point contacts 1 and 2 are biased, an input signal from the source 27 will be transmitted to the output circuit connected to the point contact 2. Connection from the emitter E to the output circuits associated with the contact points 4, 6, 8 and 10 may be established by biasing the contacts indicated by the following table:

| Output Contact | Contacts to be Biased |
|---|---|
| 4 | 1, 3, 4. |
| 6 | 1, 3, 5, 6. |
| 8 | 1, 3, 5, 7, 8. |
| 10 | 1, 3, 5, 7, 9, 10. |

Alternatively, contacts E, 1, 3, 5, 7 and 9 could be biased permanently and transmission to one or more of the output terminals 2, 4, 6, 8 and 10 established by biasing the desired output terminal or terminals.

Figure 7:
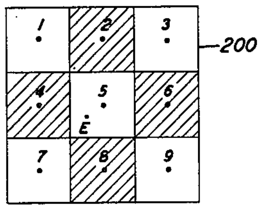
Figs. 7 and 8 are plan and elevational views of a translating device similar to that shown in Figs. 4 and 5 but having a different arrangement of the zones in the semiconductive body.
Figure 8:
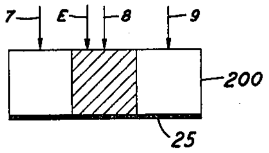

In the embodiment of the invention illustrated in Figs. 7 and 8, the several P and N-type zones are arranged in checkerboard array. The emitter E bears against the zone with which the point contact 5 is associated. A signal may be transferred or switched from the emitter E to any one of the zones by biasing an appropriate one or two of the point contacts in addition to the point contact 5. For example, the signal may be switched or transferred to the zone with which the point contact 2 is associated by biasing the point contacts 2 and 5 each in the reverse direction with respect to the respective zone. Similarly, the signal may be transferred or switched to the contact 3 by appropriately biasing the point contacts 2, 3 and 5. Either type of zone, that is either the N zones or the P zones, may have individual output circuits connected to the contacts bearing thereagainst. Alternatively, output circuits may be connected to pairs of the point contacts to produce a push-pull type output. For example, contacts 1 and 2, 3 and 6, and so on may be utilized to produce such push-pull operation. It will be appreciated that amplification may be realized in each of the paths to which the signal is transferred or switched, as has been described heretofore.

The device illustrated in Fig. 7 may be utilized in other manners. For example, the emitter E may bear against any one of the zones associated with the contacts 2, 5 or 8 and these zones biased permanently. Transmission at any one or more of contacts 1, 3, 4, 6, 7 and 9, serving as output terminals, may be effected by biasing the desired terminal contact or contacts.

The device illustrated in Figs. 9 and 10 is a modification of that illustrated in Figs. 7 and 8 and described hereinabove. In the embodiment illustrated in Figs. 9 and 10, the P zones 210 are in the form of islands in the N-type body 200. It will be understood, of course, that similarly, N zones in a P-type body may be utilized.

Another embodiment of this invention similar to that shown in Figs. 4 and 5 but providing an increased number of individual output circuits to which the signal may be transferred from the emitter E is illustrated in Figs. 11 and 12. The semiconductive body 200 has in each of two opposite face portions, thereof P and N zones arranged in the manner disclosed in Fig. 4 and the zones in the two faces are disposed so that each P zone on one face is opposite and contiguous with an N zone on the other face. The signal may be transferred from the emitter E to any one of the zones on one face, specifically the left-hand face in Fig. 11, in a manner which will be apparent from the discussion hereinabove of Figs. 4 and 5. It can then be transferred to the corresponding zone on the opposite face, that is the right-hand face in Fig. 11, by applying the appropriate bias to this opposite zone. Thus, for example, in a particular device such as illustrated in Figs. 11 and 12 having eight zones on each face, the signal impressed at the emitter may be transferred or switched to any one of eight zones on the face of the body opposite to that against which the emitter bears. Individual output circuits may be connected to the point contacts bearing against the zones to which the signal is transferred.

Although specific embodiments of this invention have been illustrated and described, it will be understood that they are but illustrative and that various modifications may be made therein without departing from the scope and spirit of this invention.

What is claimed is:

1. A translating device comprising a body of semiconductive material having therein at least three contiguous zones of opposite conductivity type, the zones of one type being in alternate relation with those of the other type, a base connection to said body, an emitter connection to one of said zones, and individual rectifying connections to said zones.

2. A translating device comprising a semiconductive body, a plurality of collector connections to one face of said body, said body having therein contiguous regions of opposite conductivity type, said connections being associated with said regions such that each pair of adjacent connections are to regions of opposite conductivity type, a base connection to said body, and an emitter connection to one of said regions.

3. A translating device comprising a body of semiconductive material, a series of rectifying connections to one face of said body, and an emitter connection and a base connection to said body, said body having therein contiguous zones of opposite conductivity type disposed such that each pair of successive rectifying connections in said series lie on opposite sides of a junction between contiguous zones.

4. A translating device comprising a body of semiconductive material of one conductivity type having in one face portion thereof spaced zones of conductivity type opposite to that of the body, individual rectifying connections to said zones, a plurality of other rectifying connections to said body, one for each of said first connections and in proximity thereto, a base connection to said body, and an emitter connection to said body in proximity to one of said other connections.

5. A translating device comprising a body of N conductivity type germanium having in one face thereof spaced zones of P type, individual point contacts bearing against each of said zones, a plurality of other point contacts, one for each of said first point contacts and in proximity thereto, bearing against said body, a base connection to said body, and an emitter connection to said body in proximity to one of said other point contacts.

6. A translating device comprising a body of semiconductive material of one conductivity type and having extending across one surface thereof a zone of conductivity type opposite that of the body, spaced rectifying connections to said zone, a plurality of other rectifying connections to said body each in proximity to a respective one of said first connections, an emitter connection to said body in proximity to one of said other connections, and a base connection to said body.

7. A translating device comprising a body of semiconductive material having two zones of opposite conductivity type meeting at a barrier, a group of spaced rectifying connections to one of said zones, a second group of rectifying connections to the other of said zones, each connection of said second group being opposite and in proximity to a respective connection of said first group and all of said connections being immediately adjacent said barrier, a base connection to one of said zones, and an emitter connection to said body in proximity to one of said rectifying connections.

8. An amplifier comprising a body of semiconductive material having therein a row of contiguous regions of opposite conductivity type with the regions of the two types in alternate relation, individual rectifying connections to said regions, a base connection to said body, an emitter connection to one of the end regions of said row, an input circuit coupled between said emitter and base connections, means biasing each of said rectifying connections in the reverse direction relative to the respective region, and an output circuit coupled to the rectifying connection to the other end region in said row.

9. An amplifier comprising a body of N-type germanium having in one face thereof spaced zones of P conductivity type, a row of point contacts, one group of alternate contacts bearing against respective P zones and the other alternate contacts bearing against said N-type body, an emitter connection to said body in proximity to the one of said other contacts at one end of said row, a base connection to said body, an input circuit coupled between said emitter and base connections, an output connection coupled between said base connection and the point contact at the other end of said row, and means biasing each of said contacts in the reverse direction, the bias upon successive contacts in the direction away from said one end of said row, in each group of alternate contacts, increasing.

10. A translating device comprising a semiconductive body having therein an array of contiguous zones of opposite conductivity type in alternate relation, individual rectifying connections to said zones, a base connection to said body, an emitter connection to one of said zones, means for impressing signals between said base and emitter connections, and means for transferring said signals from said emitter connection to any selected one of said rectifying connections comprising means for biasing each of the rectifying connections between said emitter and the selected connection in a path through zones of opposite conductivity type in alternation in the reverse direction relative to the respective zone.

11. A translating device comprising a body of semiconductive material having therein an array of contiguous zones, each pair of laterally adjacent zones being of opposite conductivity type, an emitter connection to one of said zones, a base connection to said body, an input circuit connected between said emitter and base connections, individual rectifying connections to said zones, a plurality of output circuits each coupled to a respective one of said rectifying connections, and means for selectively coupling said input circuit to any one of said output circuits through said body comprising means for selectively biasing groups of said rectifying connections, each in the reverse direction relative to the respective zone.

12. A translating device comprising a semiconductive body having therein two contiguous rows of contiguous zones, adjacent zones in each row being of opposite conductivity type and adjacent zones in the two rows also being of opposite conductivity type, a base connection to said body, an emitter connection to one of the zones in one row, an input circuit connected between said base and emitter connections, individual rectifying connections to all of said zones, and means for transferring signals impressed at said emitter to any selected one of the rectifying connections to the zones in the other of said rows, said means comprising source means for biasing each of the rectifying connections between said emitter connections and the selected rectifying connections along a path composed of zones of opposite conductivity type in alternation, in the reverse direction relative to the respective zone.

13. A translating device comprising a semiconductive body having therein zones of opposite conductivity type in checkerboard array, individual rectifying connections to said zones, a base connection to said body, an emitter connection to one of said zones, an input circuit connected between said emitter and base connections, and means for selectively biasing groups of said rectifying connections each in the reverse direction relative to the respective zone, to switch signals impressed at said emitter connection to any one of selected ones of said rectifying connections.

14. A translating device comprising a body of semiconductive material having in each of two opposite faces two contiguous rows of meeting zones of opposite conductivity type in alternate relation, adjacent zones in each of the two rows being of opposite conductivity type, each zone in each row meeting a corresponding zone of the opposite face, within said body and being of opposite conductivity type thereto, a base connection to said body, an emitter connection to one of the zones in one face of said body, individual rectifying connections to the zones in said one face, and individual collector connections to the zones in the other face.

WILLIAM G. PFANN.

REFERENCES CITED

The following references are of record in the file of this patent:

UNITED STATES PATENTS

| Number | Name | Date |
|---|---|---|
| 2,502,479 | Pearson | Apr. 4, 1950 |
| 2,502,488 | Schockley | Apr. 4, 1950 |